(12) United States Patent
Lin et al.

(10) Patent No.: US 11,537,501 B2
(45) Date of Patent: Dec. 27, 2022

(54) METHOD AND DEVICE FOR MONITORING SERVER BASED ON RECORDINGS OF DATA FROM SENSORS, AND NON-TRANSITORY STORAGE MEDIUM

(71) Applicant: Fulian Precision Electronics (Tianjin) Co., LTD., Tianjin (CN)

(72) Inventors: Ting-Chieh Lin, New Taipei (TW); Yin Huang, New Taipei (TW); Chun-Te Cheng, New Taipei (TW); Sheng-Chung Pan, New Taipei (TW); Kuang-Chan Tung, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 145 days.

(21) Appl. No.: 17/097,259

(22) Filed: Nov. 13, 2020

(65) Prior Publication Data

US 2021/0365351 A1    Nov. 25, 2021

(30) Foreign Application Priority Data

May 21, 2020    (CN) .......................... 202010438231.6

(51) Int. Cl.
*G06F 11/34* (2006.01)
*G06F 11/30* (2006.01)
*G06F 11/32* (2006.01)

(52) U.S. Cl.
CPC ...... *G06F 11/3495* (2013.01); *G06F 11/3006* (2013.01); *G06F 11/3089* (2013.01); *G06F 11/32* (2013.01)

(58) Field of Classification Search
None
See application file for complete search history.

(56) References Cited

U.S. PATENT DOCUMENTS 7,827,442 B2 * 11/2010 Sharma .................... G05B 9/03
714/13
9,921,915 B2 * 3/2018 Hung .................... G06F 21/572
(Continued)

FOREIGN PATENT DOCUMENTS

CN        101848109         9/2010
CN        105224436         1/2016
(Continued)

OTHER PUBLICATIONS

Pebam, Robert, and G. R. Smitha. "Implementation of Sensor Data Record Generation Automation Tool for Baseboard Management Controller." International Journal of Engineering Research and Development 7.9 (2013): 16-21. (Year: 2013).*

(Continued)

*Primary Examiner* — Matthew J Brophy
(74) *Attorney, Agent, or Firm* — ScienBiziP, P.C.

(57) ABSTRACT

A method for monitoring multiple servers in one or more server clusters includes collecting and recording sensor data (SDR data) and storing the SDR as a predetermined file format into a specified storage area. The SDR stored in the specified storage area is analyzed according to a predetermined analysis rule to determine whether the SDR comprises data indicating abnormal functioning on a moment-by-moment basis SDR. When the SDR indicates an abnormality, SDR warning information corresponding to the abnormality SDR is outputted. A server monitoring device utilizing the method and a non-transitory storage medium are also provided.

15 Claims, 3 Drawing Sheets

(56) References Cited

U.S. PATENT DOCUMENTS

| | | | | |
|---|---|---|---|---|
| 10,924,350 | B1* | 2/2021 | Kaminski | G06F 11/3065 |
| 2003/0130969 | A1* | 7/2003 | Hawkins | H04L 12/66 |
| | | | | 706/15 |
| 2004/0133398 | A1* | 7/2004 | Merkin | G06F 11/3058 |
| | | | | 702/188 |
| 2004/0249913 | A1* | 12/2004 | Kaufman, Jr. | G06F 11/3006 |
| | | | | 714/E11.207 |
| 2006/0158325 | A1* | 7/2006 | Cha | H04L 67/125 |
| | | | | 340/521 |
| 2006/0167919 | A1* | 7/2006 | Hsieh | G06F 11/3664 |
| 2009/0089624 | A1* | 4/2009 | Austen | G06F 11/0706 |
| | | | | 714/39 |
| 2011/0010566 | A1* | 1/2011 | Bandholz | G06F 1/3203 |
| | | | | 713/300 |
| 2012/0023210 | A1* | 1/2012 | Lai | G06F 11/3055 |
| | | | | 709/223 |
| 2012/0166605 | A1* | 6/2012 | Chou | G06F 11/3006 |
| | | | | 709/223 |
| 2013/0283099 | A1* | 10/2013 | Huang | G06F 11/3058 |
| | | | | 714/E11.178 |
| 2014/0032641 | A1* | 1/2014 | Du | G06F 9/455 |
| | | | | 709/203 |
| 2015/0067084 | A1* | 3/2015 | Yeh | G06F 11/2007 |
| | | | | 709/219 |
| 2015/0127814 | A1* | 5/2015 | Hu | G06F 11/3031 |
| | | | | 709/224 |
| 2017/0097880 | A1* | 4/2017 | Yeh | G06F 11/3466 |
| 2017/0364818 | A1* | 12/2017 | Wu | G06F 11/3006 |
| 2020/0356380 | A1* | 11/2020 | Kelly | G06F 11/3051 |
| 2021/0133081 | A1* | 5/2021 | Kelly | G06F 11/0772 |
| 2021/0365351 | A1* | 11/2021 | Lin | G06F 11/3006 |
| 2022/0050765 | A1* | 2/2022 | Pan | G06F 40/30 |
| 2022/0091920 | A1* | 3/2022 | Fujisaki | G06F 11/079 |
| 2022/0113340 | A1* | 4/2022 | Kacenjar | H04B 17/391 |

FOREIGN PATENT DOCUMENTS

| | | |
|---|---|---|
| CN | 107729209 | 2/2018 |
| CN | 109189640 | 1/2019 |

OTHER PUBLICATIONS

Hongsong, Chen, and Wang Xiaomei. "Design and Implementation of Cloud Server Remote Management System Based on IMPI Protocol." 2015 IEEE 12th Intl Conf on Ubiquitous Intelligence and Computing. IEEE, 2015 (Year: 2015).*

Vanderlinden, Steven L., et al. "BladeCenter T system for the telecommunications industry." IBM journal of research and development 49.6 (2005): 873-886. (Year: 2022).*

* cited by examiner

METHOD AND DEVICE FOR MONITORING SERVER BASED ON RECORDINGS OF DATA FROM SENSORS, AND NON-TRANSITORY STORAGE MEDIUM

FIELD

The subject matter herein generally relates to server monitoring.

BACKGROUND

A baseboard management controller (BMC) can be used to monitor and manage an operating state of a server system. The BMC can record system events in a non-transitory system event log (SEL). For example, the system events can include abnormal temperatures, abnormal voltages, and abnormal fan and cooling situations. The BMC can also manage recordings of data from sensors (in a sensor data record storage library (SDRR)), and search streamed information of the server system from the SDRR. The log information generated by the BMC is an important indicator for checking the running status of the server system. However, abnormal events noted by the sensors cannot be obtained based on the log information generated by BMC.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
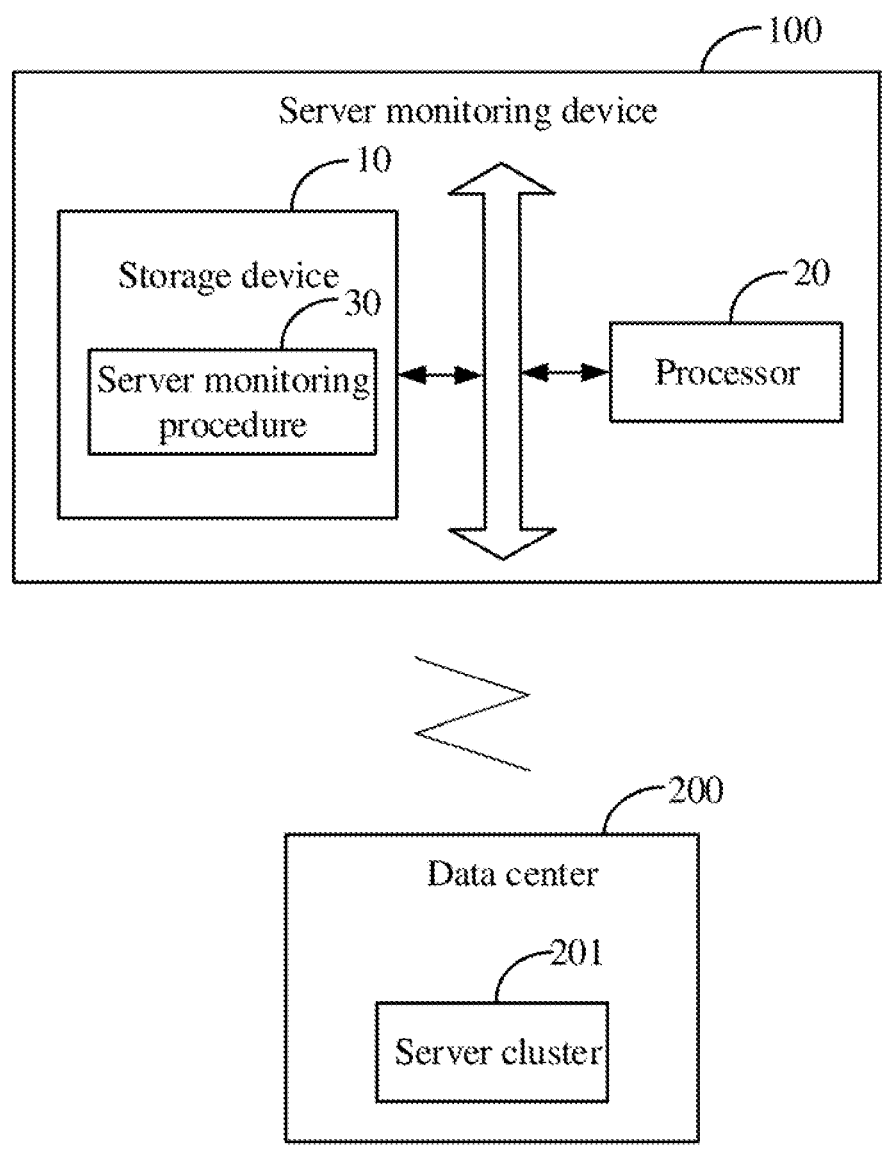
FIG. 1 illustrates a block view of an embodiment of a server monitoring device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a block view of an embodiment of a server monitoring device.

In one embodiment, the server monitoring device 100 can monitor multiple servers of a data center 200. For example, the data center 200 can comprise one or more server clusters 201, and each of the server clusters 201 may comprise multiple servers. The server monitoring device 100 can also monitor independent servers or server clusters specified by a user according to an actual requirement.

The server monitoring device 100 can comprise a storage device 10, at least one processor 20, and a server monitoring procedure 30 stored in the storage device 10. The server monitoring procedure 30 can be run on the at least one processor 20. The at least one processor 20 can execute the server monitoring procedure 30 to accomplish the steps of a server monitoring method, for example, the steps 300-306 of FIG. 3. The at least one processor 20 can alternatively execute the server monitoring procedure 30 to accomplish the function of the modules of the server monitoring procedure 30, for example, to accomplish the function of the modules 101-105 of FIG. 2.

Figure 2:
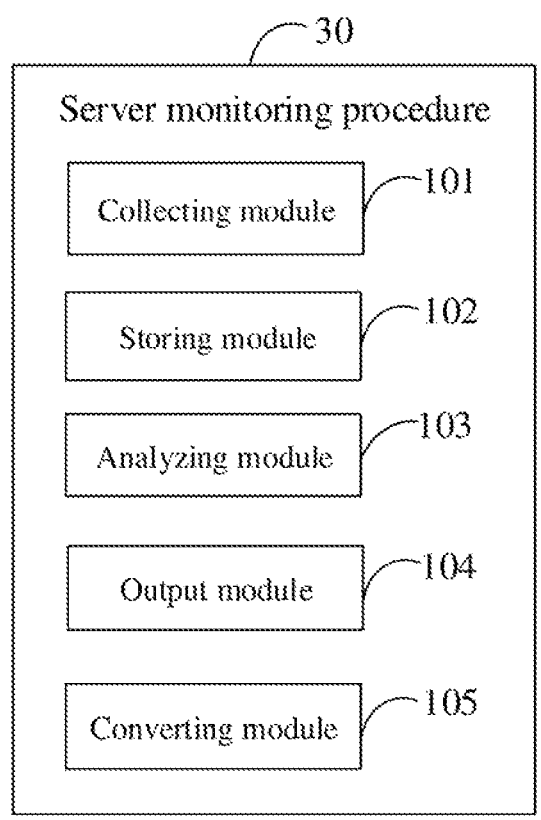
FIG. 2 illustrates a block view of an embodiment of the functions and structure of the device of FIG. 1.

The server monitoring procedure 30 can be divided into one or more modules/units. The one or more modules/units can be stored in the storage device 10 and executed by the at least one processor 20. The one or more modules/units can be a series of program instruction segments, which can perform specific functions, the instruction segments describing the execution process of the server monitoring procedure 30 in the server monitoring device 100. For example, the server monitoring procedure 30 can be divided into a collecting module 101, a storing module 102, an analyzing module 103, an output module 104, and a converting module 105, as shown in FIG. 2. The detail function of each module is described in FIG. 2.

The server monitoring device 100 exemplified in FIG. 1 is an example only. The block view is not to be considered as limiting the server monitoring device 100. Additional components can be added, or fewer components can be utilized, or some components can be combined, or different components can be used without departing from the claims of this disclosure. For example, the server monitoring device 100 may also comprise a display device, a network accessing device, a bus, or the like.

The at least one processor 20 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 20 can be a microprocessor or any regular processor, or the like.

The storage device 10 stores the server monitoring procedure 30 and/or modules/units. The at least one processor 20 can run or execute the server monitoring procedure 30 and/or modules/units stored in the storage device 10, and accomplish the various functions of the server monitoring device 100. In addition, the storage device 10 can include a non-transitory storage medium, such as hard disk, memory, plug-in hard disk, smart media card, secure digital, flash card, at least one disk storage device, flash memory, or other transitory storage medium.

FIG. 2 illustrates an embodiment of the server monitoring procedure 30.

The server monitoring procedure 30 can comprise the collecting module 101, the storing module 102, the analyzing module 103, the output module 104, and the converting module 105. In one embodiment, the modules can be stored in the storage device 10 and can be run on the at least one processor 20. It can be understood that, in other embodiments, the modules can be instructions or firmware resident in the at least one processor 20.

The collecting module 101 can collect and record data of sensors (sensor data record or SDR) of a server cluster.

In one embodiment, the server cluster can comprise at least one server, and may be a server cluster designated by the user to be monitored, such as a server cluster in the data center 200. The collecting module 101 can collect the sensor data record of the server cluster.

In one embodiment, the collecting module 101 can access a system under test (SUT) associated with the server cluster through a web page. The SUT can comprise SDR monitors, and the server monitoring device 100 can send control instructions to the SDR monitors. Then, the collecting module 101 can collect the SDR of each server of the server cluster.

In one embodiment, the collecting module 101 can communicate with a intelligent platform management interface (IPMI) monitor of the server cluster to collect the SDR.

For each server of the cluster, physical characteristics of each server can be monitored by the IPMI. For example, the physical characteristics of each server can be monitored by sensors distributed in a server substrate, a system board, a chassis, a fan, etc., and the SDR can be generated based on data monitored by the sensors. The SDR can be stored in a sensor data record storage library (SDRR), the physical characteristics can comprise temperature data, voltage data, fan data, power data, etc. A baseboard management controller (BMC) installed in the server can monitor system events of the server and record the system events in a non-transitory system event log (SEL). In a process of monitoring the server, the BMC can also manage the SDRR and search information from the SDRR as to the second-by-second running of the server system.

The storing module 102 can store the SDR as a predetermined file format into a specified storage area.

In one embodiment, the predetermined file format can be defined according to an actual requirement, for example, the predetermined file format can be a comma-separated values (CSV) file format. The specified storage area can also be defined according to the actual requirement, for example, the specified storage area can be a file server, or a database. Files stored in the specified storage area can be distinguished by a name of the server, a serial number of the server, or a name of the SUT corresponding to the server. These names and titles can be rendered as file names, convenient for file management and viewing. For example, the storing module 102 can store collected SDR to a specified file server in the form of files such as SDR_SUT_1.CSV, SDR_SUT_2.CSV, SDR_SUT_3.CSV, . . . , SDR_SUT_n.CSV, etc.

The analyzing module 103 can analyze the SDR stored in the specified storage area according to a predetermined analysis rule to determine whether the data in SDR comprises abnormalities.

In one embodiment, the predetermined analysis rule can comprise one or more analysis rules for different types of the SDR, and can be adjusted according to the actual requirement. The different types of the SDR can refer to different types of parameters, such as voltage parameters, temperature parameters, and rotational speed parameters. One type of SDR can correspond to different rules of analysis, such as a central processing unit (CPU) temperature and a hard disk temperature being subjected to different rules of analysis.

In one embodiment, if the SDR comprises CPU temperature data and power consumption data, CPU temperature data and power consumption data are detected when a stress test (the ability to drive a load) is turned on or the stress test is ended. The predetermined analysis rule can comprise: when the stress test is turned on (under a high load state), CPU temperature would be increased with respect to the previously unopened stress test, and power consumption of a power supply would be increased with respect to the previously unopened stress test; when the stress test is ended, the CPU temperature would be decreased with respect to the previously opened stress test, the power consumption of the power supply would be decreased with respect to the previously opened stress test. Otherwise, the analyzing module 103 can determine that the SDR comprise data as to abnormalities and locate the SDR containing the data.

In one embodiment, chip voltage may need to be maintained in a stable state, and temperature or fan speed may be dynamically varying during an operating state of the server. The predetermined analysis rule can comprise analyzing N continuous items of SDR (such as N=50), and if the N items relate to voltage, the N continuous SDR should be constant. If the N continuous SDR relate to temperature or fan speed, the N continuous SDR should vary, as a dynamic value, that is, the N consecutive SDR are not each the same. Otherwise, the analyzing module 103 can determine that the N continuous SDR comprise data as to abnormalities and locate the SDR containing the data.

In one embodiment, the SDR of components belonging to a group may need to be basically the same. The predetermined analysis rule can comprise searching for differences in the SDR which are outside a predetermined difference range. For example, if the group comprises multiple CPUs in a normally working state, a temperature difference of each of the multiple CPUs should be within 15% at any time; if the group comprises multiple solid state drives (SSDs) in a normally working state, a temperature difference of each of the multiple SSDs should be within 10% at any time; if the group comprises multiple fans in a normal working state, a difference of rotation speed of each of the multiple fans should be within 10% at any time. Otherwise, if the analyzing module 103 determines that the SDR comprises data which show values which are not within the relevant predetermined difference range, data as to such values can be deemed abnormal, or deemed to represent abnormalities, and such data can be located within the SDR.

In one embodiment, the predetermined analysis rule can also comprise the fan speed increasing as a rule at the beginning of a self-test and decreasing as a rule at the end of the self-test, during a self-test of the server. For example, the fan speed should be increased by at least 20% at the beginning of the self-test and the fan speed should be decreased by at least 20% at the end of the self-test. If the fan speed is otherwise, or behaves differently, the analyzing module 103 can determine that fan data comprises abnormal data and locate the abnormal data.

In one embodiment, the analyzing module 103 can also find and analyze the abnormal data combining with the SEL file to determine whether the abnormal data is caused by an abnormal sensor or an abnormal component of the server.

In one embodiment, the abnormal data comprises a first type of abnormal SDR and a second type of abnormal SDR. The first type of abnormal SDR can trigger the BMC to generate the abnormal log file, and the second type of abnormal SDR does not trigger the BMC to generate the abnormal log file. The analyzing module 103 can search for error information that the BMC does not report, and can find out in advance signs of abnormality/malfunction of the components of the server to let the user know that the components may be damaged.

The output module 104 can output warning information of abnormal components corresponding to the abnormal SDR.

In one embodiment, the abnormal components can comprise sensors for monitoring the components of the server and the components of the server. That is, the abnormal SDR may be caused by the sensors or the components of the server. The warning information comprises abnormal information and time intervals of the occurrences of the abnormalities. The abnormal information may record component name, component number, and brief information as to the abnormality.

In one embodiment, the server monitoring device 100 can implement a screening function and reporting functions of the abnormal log files of the BMC. The collecting module 101 can obtain log files generated by the BMC of each server of the server cluster, and the analyzing module 103 can detect whether the log files generated by the BMC comprise abnormal log files. For example, the analyzing module 103 can determine whether the log files comprise predetermined matching information, and determine whether parameters of the components recorded in the log files exceeds certain thresholds. The output module 104 can output and display the abnormal log files detected by the analyzing module 103.

In one embodiment, the analyzing module 103 can determine whether the abnormal log files comprise log files corresponding to the first type of abnormal SDR, to apply a doublechecking of the log files generated by the BMC. If the abnormal log files do not comprise the log files corresponding to the first type of abnormal SDR, it may indicate that the BMC may have missed recording system log events or the SDR comprising abnormal records, the output module 104 may output a predetermined prompt message to remind an administrator of the server cluster to check.

In one embodiment, when the analyzing module 103 determines that the SDR comprises the abnormal data, the analyzing module 103 can generate abnormal SDR log files based on the abnormal data, and the output module 104 can output the abnormal SDR log files for the administrator to view as the log file is created.

In one embodiment, the abnormal SDR log files can be stored in a database for backup for the administrator to view or to perform big data analysis.

In one embodiment, in order to facilitate the administrator viewing the SDR and checking the working status of the components of each server, the converting module 105 can classify the SDR and convert the SDR into SDR graphs, and the output module 104 can output the SDR graphs on a display interface.

In one embodiment, each SDR graph can correspond to the data monitored by each sensor, and the converting module 105 can monitor the collected SDR in real time and update the SDR graphs.

Figure 3:
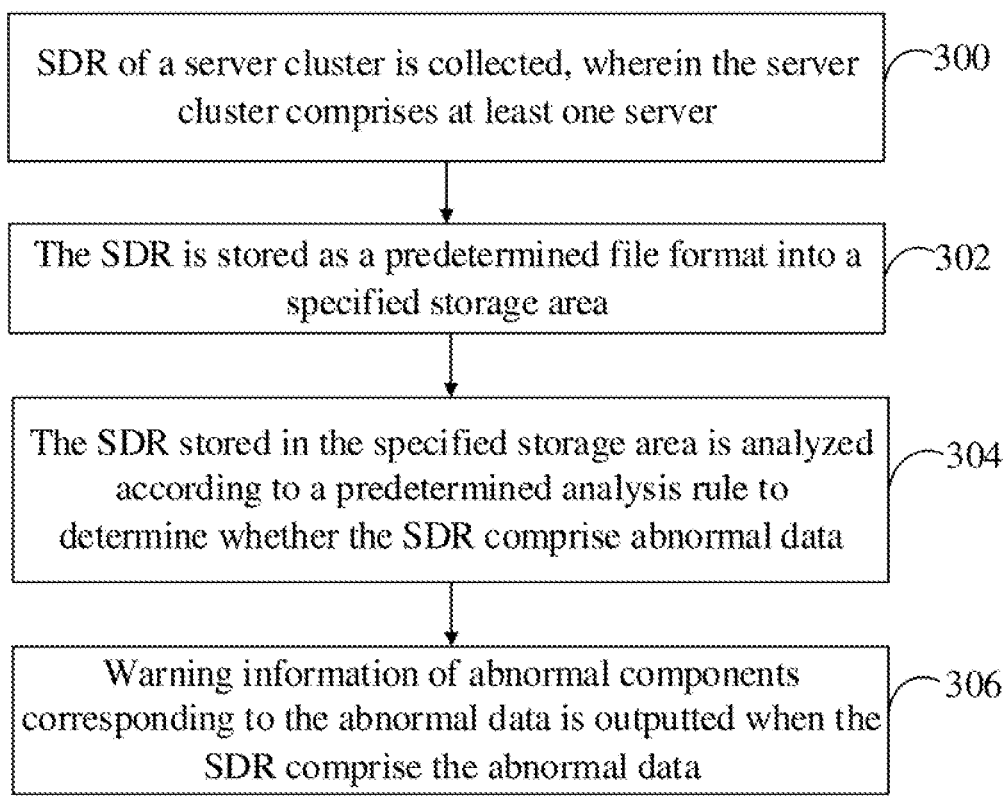
FIG. 3 illustrates a flowchart of an embodiment of a method for server monitoring utilized in the device of FIG. 1.

FIG. 3 illustrates one exemplary embodiment of a server monitoring method. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, SDR of a server cluster is collected, wherein the server cluster comprises at least one server.

In block 302, the SDR is stored as a predetermined file format into a specified storage area.

In block 304, the SDR stored in the specified storage area is analyzed according to a predetermined analysis rule to determine whether the SDR comprise abnormal data.

In block 306, warning information of abnormal components corresponding to the abnormal data is outputted when the SDR comprise the abnormal data.

The embodiments shown and described above are only examples. Many details known in the relevant field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A server monitoring method comprising:
   collecting sensor data record (SDR) of a server cluster and obtaining log files generated by baseboard management controllers (BMCs) of the server cluster, wherein the server cluster comprises at least one server;
   storing the SDR as a predetermined file format into a specified storage area;
   determining whether the SDR stored in the specified storage area comprise abnormal data according to a predetermined analysis rule;
   analyzing the abnormal data in combination with the log files to determine abnormal components corresponding to the abnormal data; and
   outputting warning information of the abnormal components;
   wherein the abnormal data comprise a first type of abnormal SDR and a second type of abnormal SDR, the first type of abnormal SDR can trigger the BMC to generate the abnormal log file, and the second type of abnormal SDR cannot trigger the BMC to generate the abnormal log file.

2. The server monitoring method of claim 1, further comprising:
   determining whether the log files generated by the BMCs comprise one or more abnormal log files, and outputting the one or more abnormal log files.

3. The server monitoring method of claim 2, further comprising:
   determining whether the one or more abnormal log files comprise a log file corresponding to the first type of abnormal SDR; and
   outputting a predetermined prompt message when the one or more abnormal log files do not comprise the log file corresponding to the first type of abnormal SDR.

4. The server monitoring method of claim 1, wherein outputting the warning information of the abnormal components comprises:
   generating abnormal SDR log files based on the abnormal data; and
   outputting the abnormal SDR log files and the warning information of the abnormal.

5. The server monitoring method of claim 1, further comprising:
   converting the SDR into an SDR graph and outputting the SDR graph; and
   monitoring the SDR to update the SDR graph.

6. The server monitoring method of claim 1, wherein the abnormal components comprise sensors for monitoring components of the server and/or the components of the server, and the warning information comprise abnormal information and time intervals of the abnormal information occurred.

7. The server monitoring method of claim 1, wherein collecting the SDR of the server cluster comprises:
   collecting the SDR of the server cluster through a web page accesses a system under test (SUT) associated with the server cluster.

8. A server monitoring device comprising:
   a storage device; and
   at least one processor;
   wherein the storage device stores one or more programs, which when executed by the at least one processor, causing the at least one processor to:
   collect sensor data record (SDR) of a server cluster and obtain log files generated by baseboard management controllers (BMCs) of the server cluster, wherein the server cluster comprises at least one server;
   store the SDR as a predetermined file format into a specified storage area;
   determine whether the SDR stored in the specified storage area comprise abnormal data according to a predetermined analysis rule;
   analyze the abnormal data in combination with the log files to determine abnormal components corresponding to the abnormal data; and
   output warning information of the abnormal;
   wherein the abnormal data comprise a first type of abnormal SDR and a second type of abnormal SDR, the first type of abnormal SDR can trigger the BMC to generate the abnormal log file, and the second type of abnormal SDR cannot trigger the BMC to generate the abnormal log file.

9. The server monitoring device of claim 8, wherein the at least one processor is further configured to:
   determine whether the log files generated by the BMCs comprise one or more abnormal log files, and output the one or more abnormal log files.

10. The server monitoring device of claim 9, wherein the at least one processor is further configured to:
    determine whether the one or more abnormal log files comprise a log file corresponding to the first type of abnormal SDR; and
    output a predetermined prompt message when the one or more abnormal log files do not comprise the log file corresponding to the first type of abnormal SDR.

11. The server monitoring device of claim 8, wherein the at least one processor outputting the warning information of the abnormal components comprises:
    generating abnormal SDR log files based on the abnormal data; and
    outputting the abnormal SDR log files and the warning information of the abnormal components.

12. The server monitoring device of claim 8, wherein the at least one processor is further configured to:
    convert the SDR into an SDR graph and outputting the SDR graph; and
    monitor the SDR to update the SDR graph.

13. The server monitoring device of claim 8, wherein the abnormal components comprise sensors for monitoring components of the server and/or the components of the server, and the warning information comprise abnormal information and time intervals of the abnormal information occurred.

14. The server monitoring device of claim 8, wherein the at least one processor collecting the SDR of the server cluster comprises:
    collecting the SDR of the server cluster through a web page accesses a system under test (SUT) associated with the server cluster.

15. A non-transitory storage medium having stored thereon instructions that, when executed by a processor of a device, causes the device to perform a method for monitoring server, the method comprising:
    collecting sensor data record (SDR) data of a server cluster and obtaining log files generated by baseboard management controllers (BMCs) of the server cluster, wherein the server cluster comprises at least one server;
    storing the SDR as a predetermined file format into a specified storage area;
    determining whether the SDR stored in the specified storage area comprise abnormal data according to a predetermined analysis rule;
    analyzing the abnormal data in combination with the log files to determine abnormal components corresponding to the abnormal data; and
    outputting warning information of the abnormal components;
    wherein the abnormal data comprise a first type of abnormal SDR and a second type of abnormal SDR, the first type of abnormal SDR can trigger the BMC to generate the abnormal log file, and the second type of abnormal SDR cannot trigger the BMC to generate the abnormal log file.

* * * * *